(12) United States Patent
Bandawat et al.

(10) Patent No.: US 8,070,140 B2
(45) Date of Patent: Dec. 6, 2011

(54) DURABLE PORTABLE PRESSURIZED MIST COOLING DEVICE

(75) Inventors: David Bandawat, Paradise Valley, AZ (US); Kyle Swen, San Carlos, CA (US); Chris Harsacky, San Francisco, CA (US); Chris Morast, San Francisco, CA (US); Christopher Fruhauf, San Anselmo, CA (US)

(73) Assignee: Misty Mate, Inc., Tempe, AZ (US)

( * ) Notice: Subject to any disclaimer, the term of this patent is extended or adjusted under 35 U.S.C. 154(b) by 1007 days.

(21) Appl. No.: 12/006,652

(22) Filed: Jan. 4, 2008

(65) Prior Publication Data

US 2009/0174086 A1 Jul. 9, 2009

(51) Int. Cl.
*B05B 9/08* (2006.01)
(52) U.S. Cl. ....... 261/34.1; 261/38; 239/373; 222/383.1
(58) Field of Classification Search ............ 261/24, 261/28, 34.1, 38, 78.1, 115; 239/337, 373, 239/152, 354, 360; 222/251, 372, 383.1, 222/384

See application file for complete search history.

(56) References Cited

U.S. PATENT DOCUMENTS

| | | | | |
|---|---|---|---|---|
| 1,246,213 A * | 11/1917 | Zawels et al. | ................. | 222/401 |
| 1,935,688 A * | 11/1933 | Wilbur | ........................... | 239/373 |
| 2,091,735 A * | 8/1937 | Jepson | .......................... | 222/401 |
| 4,154,401 A * | 5/1979 | Thompson | .................... | 239/373 |
| 4,606,477 A * | 8/1986 | Spengler et al. | ......... | 222/153.09 |
| 5,267,674 A * | 12/1993 | von Schuckmann | ......... | 222/401 |
| 5,335,855 A * | 8/1994 | Borod | ........................... | 239/152 |
| 5,535,951 A | 7/1996 | Utter | | |
| 5,620,140 A | 4/1997 | Utter | | |
| 5,749,502 A * | 5/1998 | Hinds | ............................ | 222/401 |
| 5,775,590 A | 7/1998 | Utter | | |
| 5,967,415 A | 10/1999 | Utter | | |
| 6,402,056 B1 * | 6/2002 | Lin | ............................... | 239/373 |
| 2004/0262329 A1 * | 12/2004 | Byron | .......................... | 222/143 |

* cited by examiner

*Primary Examiner* — Frank Lawrence, Jr.
(74) *Attorney, Agent, or Firm* — Etherton Law Group, LLC; Benjamin D. Tietgen; Sandra L. Etherton

(57) ABSTRACT

A misting apparatus that is more durable and leaks less than systems known in the art. The apparatus includes a durable, integral flow control assembly and handle, which are especially beneficial for portable misting systems. The apparatus further includes a pressure gauge for monitoring the pressure inside the tank.

14 Claims, 14 Drawing Sheets

DURABLE PORTABLE PRESSURIZED MIST COOLING DEVICE

FIELD OF INVENTION

The present invention relates to localized cooling systems. This invention relates particularly to a durable hand-held apparatus for cooling a localized area through the evaporative cooling process.

BACKGROUND

It is a well known principle that introduction of humidity into a dry atmosphere lowers the ambient atmospheric temperature. Evaporative or "swamp" coolers served as effective refrigeration devices in desert climates for over fifty years. This principle has been applied in the development of devices to cool a more localized area by spraying a fine mist. Such devices are known in the art and an examination of these devices reveals that the water is pressurized by motor power, by attachment to a tank of pressurized gas, or by manual pumping. The motor-powered sprayers tend to be heavy, noisy, and cumbersome to use, and require fuel or an electrical cord connecting the sprayer to an electrical source. The air-pressurized sprayers require that the user has constant access to a source of pressurized air to recharge the container. These limitations severely inhibit the convenience and portability of the spraying apparatus.

Manually-pumped containers eliminate the requirement for a separate source of pressurization and enabled the development of portable misting systems. In essence, a hand-pump is directly attached to a small water tank, and the user manually reciprocates the pump handle to force air into the tank to pressurize it. The device is turned on by opening a flow valve, and a fine mist is emitted from a nozzle. However, in the prior art devices, the user could not tell if the container was sufficiently pressurized to emit a fine mist without testing it by opening the valve. A container that is insufficiently pressurized would release large drops of water slowly, often dripping big drops, rather than spraying a fine mist. Insufficient pressure therefore renders the apparatus useless for its purpose because the emission isn't a mist and, moreover, it is also messy. It would be desirable to know the amount of pressure inside the container before the valve is opened. Then, if the pressure is too low to create a mist, the container could be pressurized to a sufficient level before it is turned on, avoiding drips.

In previously disclosed portable devices, the flow of mist is controlled by a flow valve connected by a plastic tube to the outside of the tank at a water outlet. Usually the connections between the tank, flow valve and tube are friction fit. That is, the flow valve just squeezes into the end of the tube and the nozzle squeezes into the end of the flow control valve, all held in place by the friction. The distance between the flow valve and the water container makes it easy to snag the flow valve or nozzle and accidentally pull one off. This is especially a problem with portable misting devices. Further, when the nozzle is detached from the apparatus, the flow valve remains connected and will still release water if opened. Without a misting nozzle on the end, essentially a stream of water is released. This, again, is especially a problem with portable misting devices because the valve could be accidentally opened during transportation and cause the water to leak out. To increase the durability of a portable mister, it would be beneficial to provide a flow valve assembly that is more durable.

A similar problem plagues the known portable misting devices with the pump handle. The handle extends form the water container a sufficient distance to make the knob on the handle easy to grasp. Unfortunately, this extension makes it easy to snag the knob and accidentally pull out the handle, making the device bigger and unwieldy, and again making storage and transportation inconvenient and messy.

Therefore, it is an object of this invention to provide an apparatus which utilizes the evaporative cooling principle in a device that is more durable and less messy than those of the prior art. It is another object of this invention to integrate the flow valve assembly and handle into the device. It is another object to provide a misting device that minimizes the risk of water leaking out as a fluid, instead of spraying out as a mist.

SUMMARY OF THE INVENTION

The present invention is a misting apparatus that is more durable and leaks less than systems known in the art. The apparatus includes a durable, integral flow control assembly and handle, which are especially beneficial for portable misting systems. The apparatus further includes a pressure gauge for monitoring the pressure inside the tank.

DETAILED DESCRIPTION OF THE INVENTION

Figure 9:
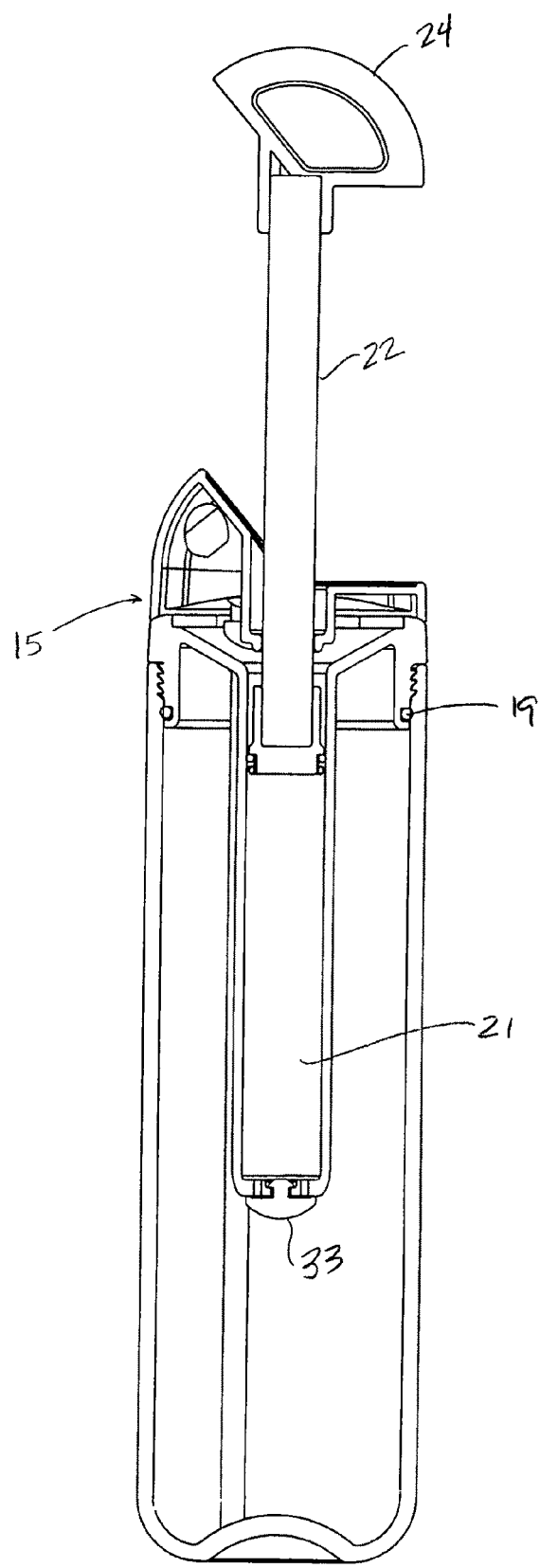
FIG. 9 is a cross-sectional view of the present invention along line 1-1, illustrating the handle in the extended position.

The present invention is a misting apparatus, designated generally as 10, used to evaporatively cool a localized area by emission of a fine mist spray. The misting apparatus 10 comprises generally a water tank 11 and a cap 15, which further comprises a pump, a flow control assembly and optionally a pressure gauge 28. FIGS. 1-4, 10-13 show the preferred embodiment of the present invention. FIGS. 5-8 and 14 show a second embodiment of the present invention having a different flow lever 31. FIG. 9 is equally applicable to both the preferred and second embodiments.

As shown in FIG. 9, the water tank 11 holds the evaporative fluid, which is usually water but can be any fluid capable of making a mist. All acceptable fluids are referred to herein as water. The tank is preferably lightweight, and may be opaque or transparent. The water tank 11 is of a size that facilitates the portability of the present invention and preferably holds up to 24 oz. Different size tanks may be interchangeable with a given cap. In the preferred embodiment, the water tank 11 is designed so that the invention can be held in a user's hand, allowing the user to direct the mist spray to cool his vicinity. The cap 15 is removed to add water to the water tank 11 and reattached to close the tank.

The cap 15 connects to the water tank 11 at the water tank's mouth 13 in a watertight and substantially air-tight seal. To achieve the seal, the cap 15 is preferably threaded along its outer surface 16, and the water tank 11 is complementarily threaded along its inner surface such that when the threads of the pieces are fully engaged, the exterior surfaces of the water tank 11 and cap 15 are integrated to achieve a substantially smooth surface. In the preferred embodiment, an o-ring 19 may be used at the interface of the water tank 11 and the cap 15 to facilitate sealing the water tank 11.

Figure 10:
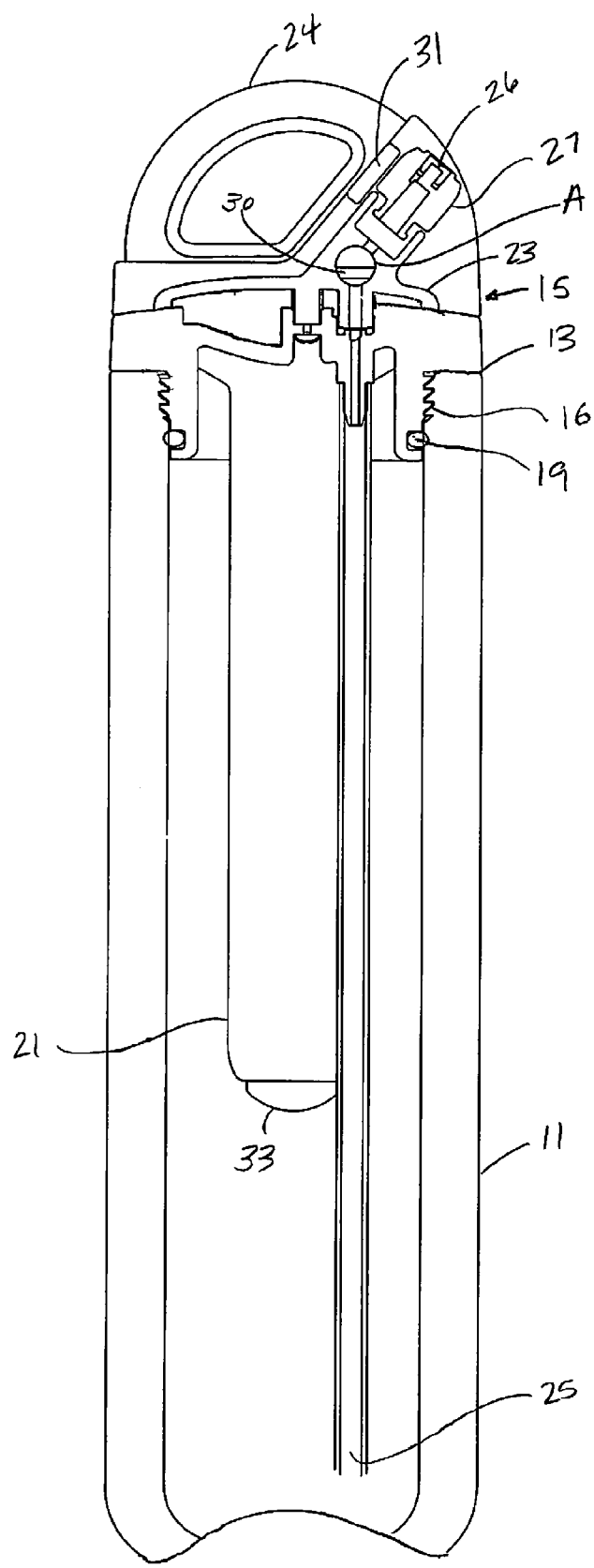
FIG. 10 is a cross-sectional view of the preferred embodiment of the present invention with the flow valve closed, taken along line 1-1.
Figure 11:
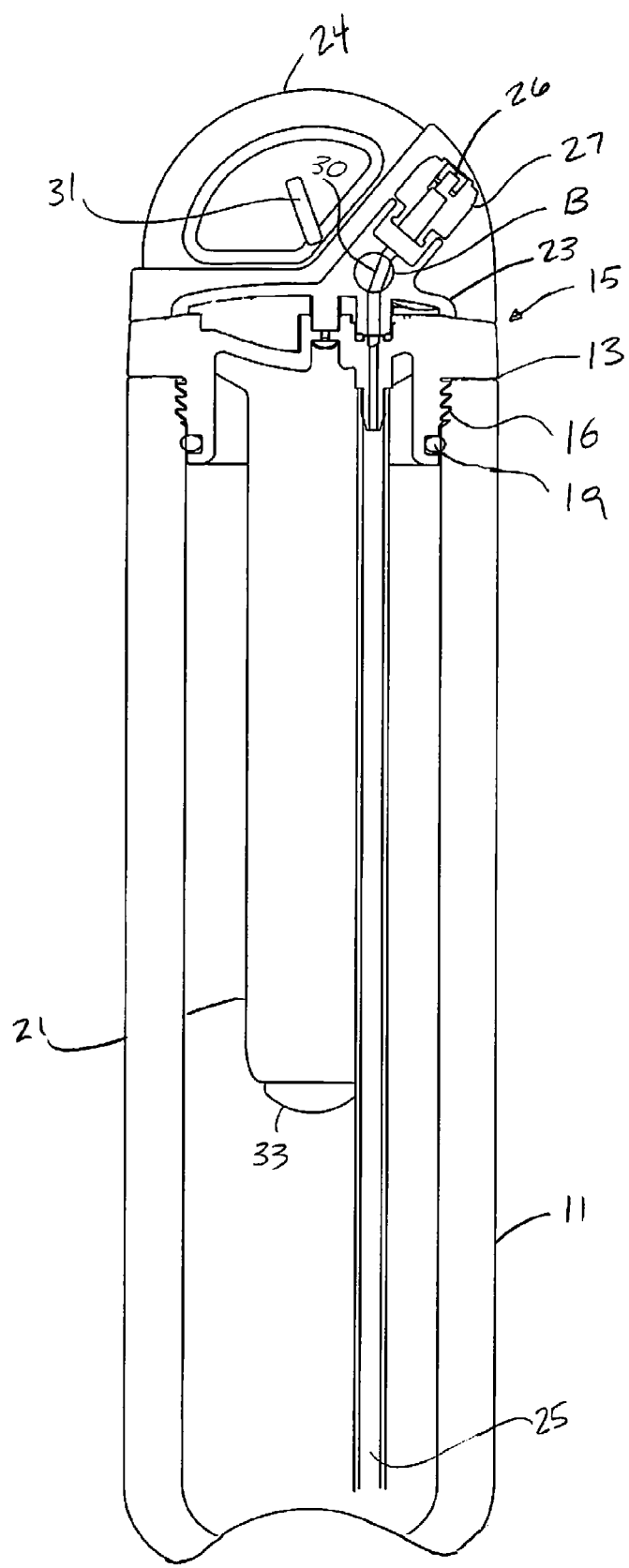
FIG. 11 is a cross-sectional view of the preferred embodiment of the present invention with the flow valve open, taken along line 1-1.
Figure 12:
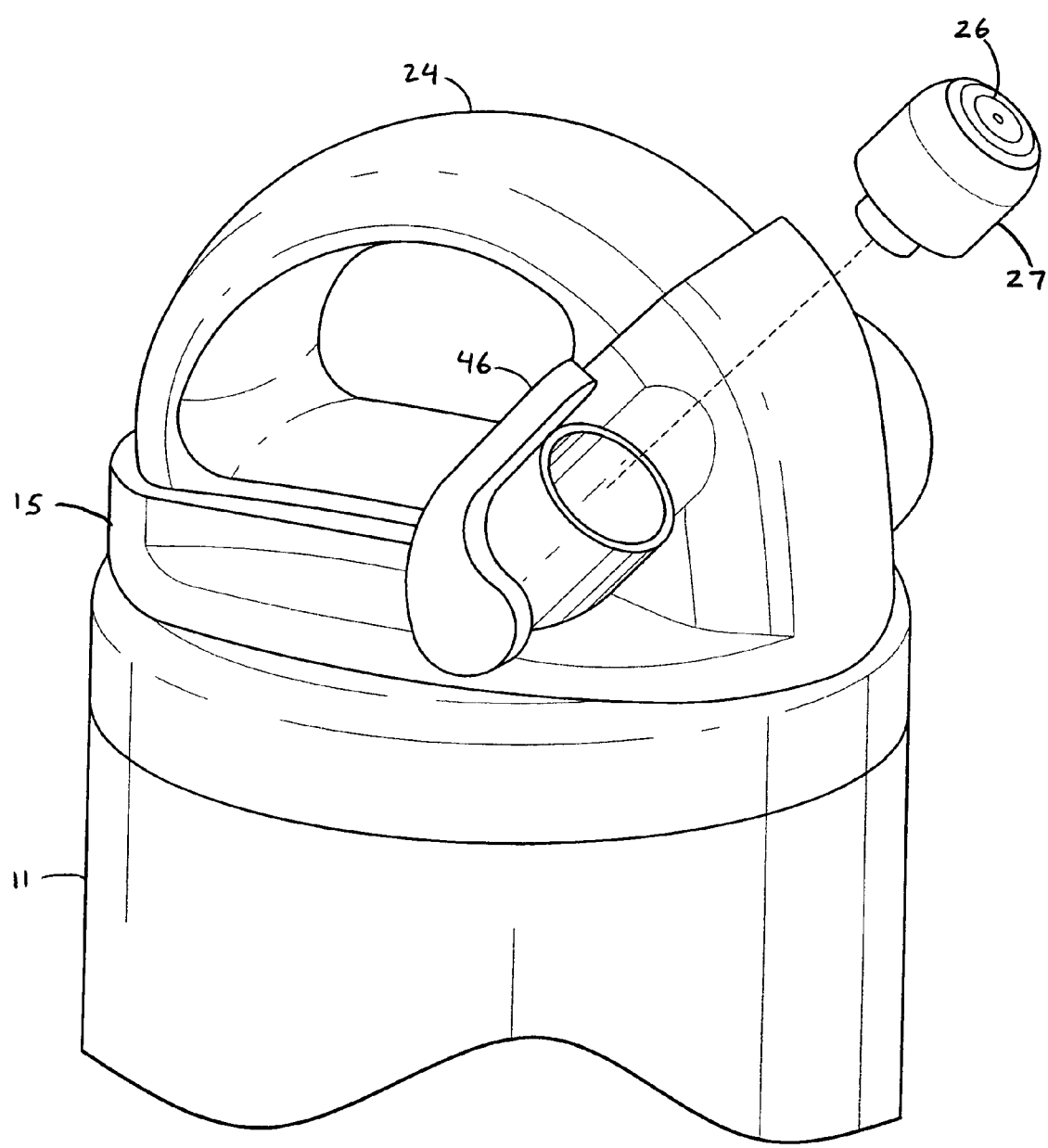
FIG. 12 is a perspective view of the upper portion of the preferred embodiment, illustrating the removable nozzle.
Figure 13:
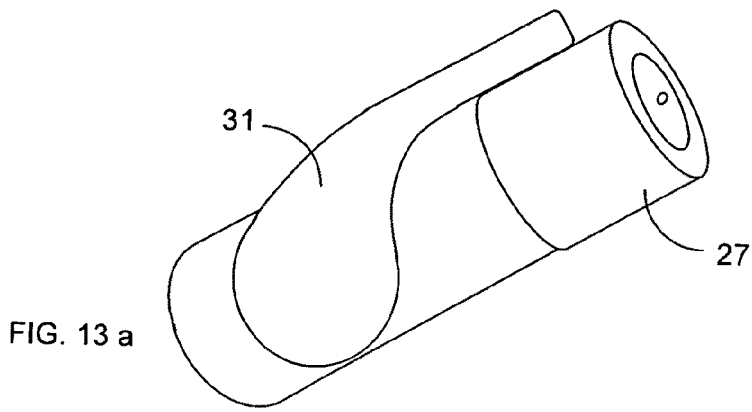
FIG. 13a is a perspective view of the flow assembly of the preferred embodiment, with the flow lever in the fully closed position.
FIG. 13b is a perspective view of the flow assembly of the preferred embodiment, with the flow lever in a partially open position.
FIG. 13c is a perspective view of the flow assembly of the preferred embodiment, with the flow lever in a fully open position.
Figure 13:
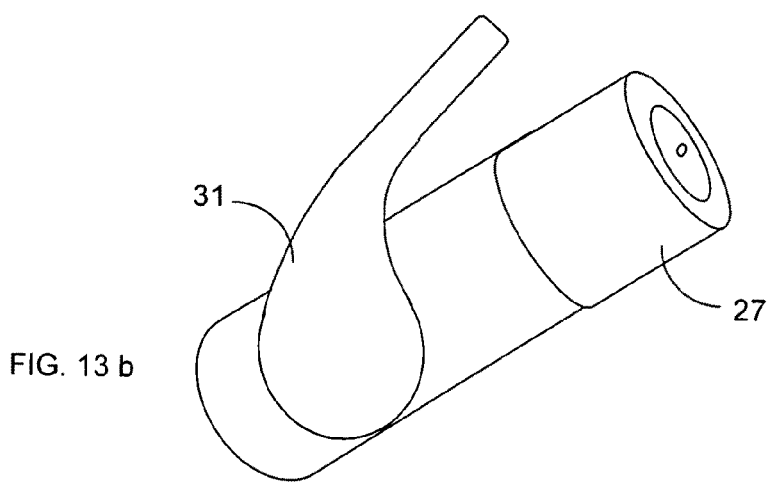
Figure 13:
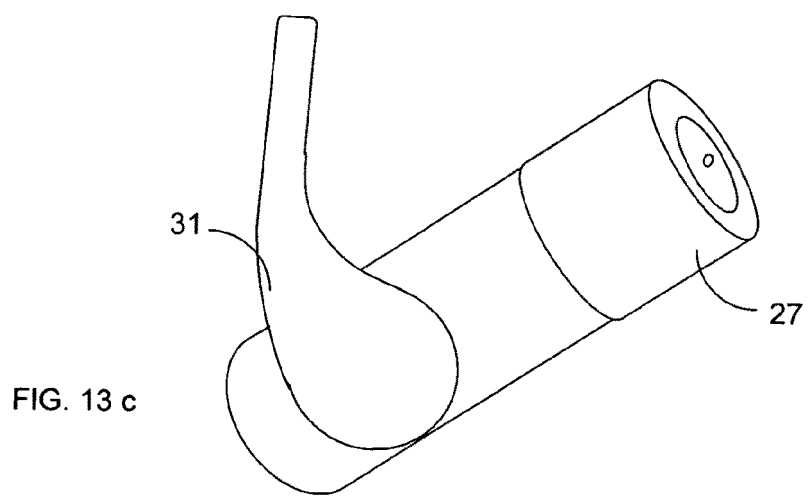

FIGS. 9-11 illustrate the cap 15 in more detail. A pump, a flow control assembly, and optionally a pressure gauge 28 are attached to, and preferably integral with, the cap 15. The pump can be any pump capable of attaching to the cap 15 and operating to pressurize the water tank 11. In the preferred embodiment, the pump is a hand-powered piston pump that includes a barrel 21, a plunger 22, a one-way valve 33, and a handle 24. The pump operates as a standard piston pump, which is known in the art. Specifically, the water tank 11 is pressurized when the user depresses the handle 24 from an extended position shown in FIG. 9 to a depressed position shown in FIGS. 1 and 5. This action pushes the plunger 22 into the barrel 21, pulling ambient air into the water tank 11 through the one-way valve 33. A reciprocating motion increases the pressure in the water tank 11. In the preferred embodiment, the handle 24 is integral with the cap to form a substantially smooth surface with few protrusions such that is not likely to snag on things and accidentally get pulled out. Optionally, the pump handle 24 can function as a carrying handle for the misting apparatus 10, and may further incorporate a locking mechanism to prevent the handle from being pulled out when used as such.

The mist is controlled by a flow control assembly comprising an inner tube 25 to conduct water from the tank 11 through a flow valve 23 to a nozzle 27. FIG. 10 shows the misting apparatus 10 in cross-section with the flow valve 23 closed, occluding the passage from the water tank 11 to the nozzle, indicated at A. FIG. 11 shows the misting apparatus 10 in cross-section with the flow valve 23 open, indicated at B, creating a clear passage from the water tank 11, out the nozzle 27, and into the surrounding environment. In the preferred embodiment, the flow valve 23 is a stopcock, in which a through-aperture in the valve is aligned with the inner tube 25 and the nozzle 27 to allow pressurized water to flow, and the through-aperture in the valve is misaligned to reduce or stop water from flowing. Alternatively, the flow valve 23 may pinch the inner tube 25 to varying degrees to reduce or stop water from flowing. The water is expelled through an atomizing insert 26 within the nozzle 27 to form the mist.

Figure 14A:
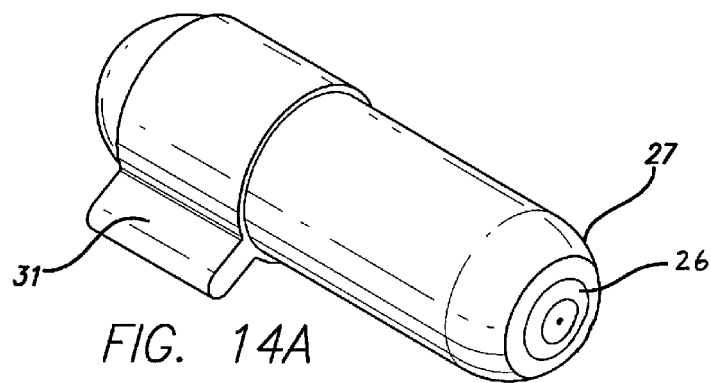
FIG. 14a is a perspective view of the flow assembly of the second embodiment, with the flow lever in the fully closed position.
Figure 14B:
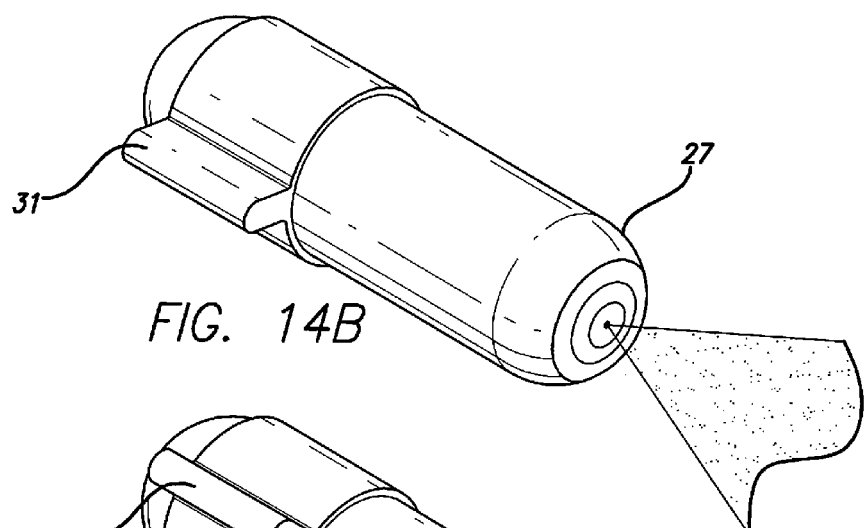
FIG. 14b is a perspective view of the flow assembly of the second embodiment, with the flow lever in a partially open position.
Figure 14C:
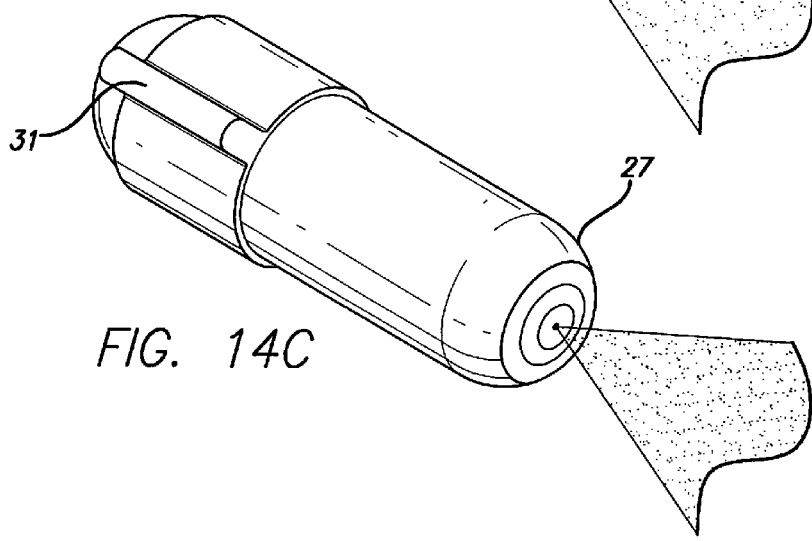
FIG. 14c is a perspective view of the flow assembly of the second embodiment, with the flow lever in a fully open position.

The water flow is partially or fully occluded by the operation of a flow lever 31 that opens and closes the flow valve 23 and, thus, the water path. While the flow lever 31 may act as a toggle, between only a fully open position to only a fully closed position, preferably the flow lever 31 enables a variable flow of pressurized water to the nozzle. That is, a variable flow lever 31 partially inhibits the emission of evaporative mist when the flow lever 31 is between the open position and the closed position, and the emission is increasingly inhibited as the flow lever 31 is moved toward the closed position. FIGS. 13a and 14a show the flow lever 31 in a fully closed position. FIGS. 13b and 14b show the flow lever 31 in a partially open position. FIGS. 13c and 14c show the flow lever 31 in a fully open position. The flow may be continuously variable or varied in discrete steps.

Figure 15A:
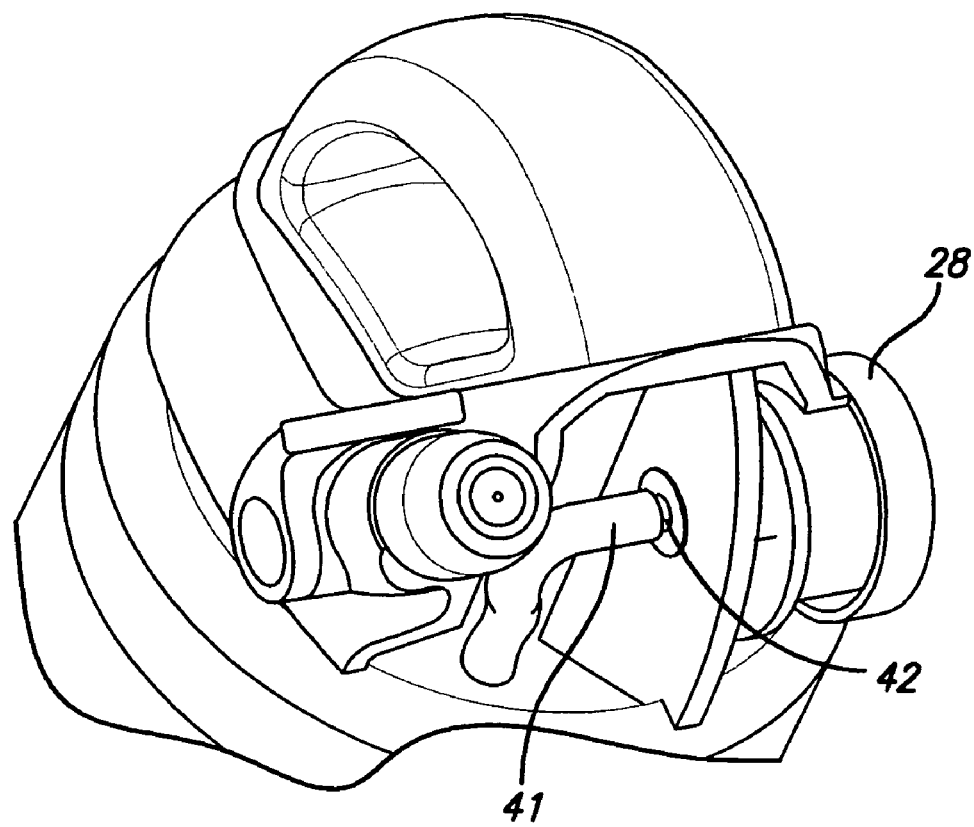
FIG. 15a is a perspective view of the pressure gauge integrated with the cap of the preferred embodiment.
Figure 15B:
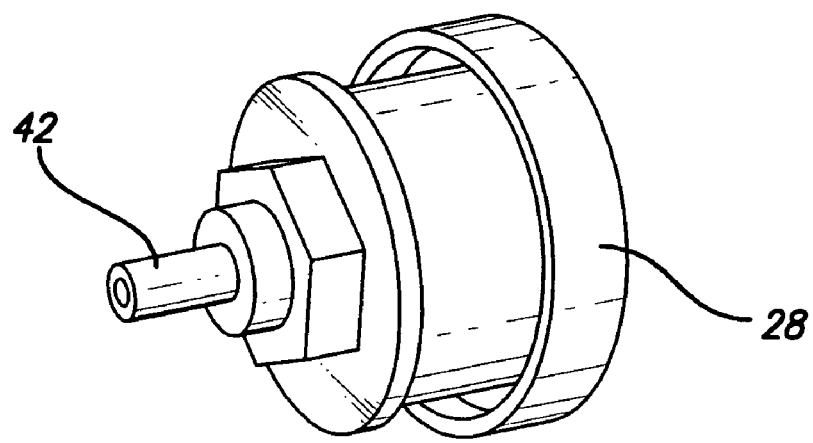
FIG. 15b is a perspective view of the pressure gauge of the preferred embodiment
Figure 15C:
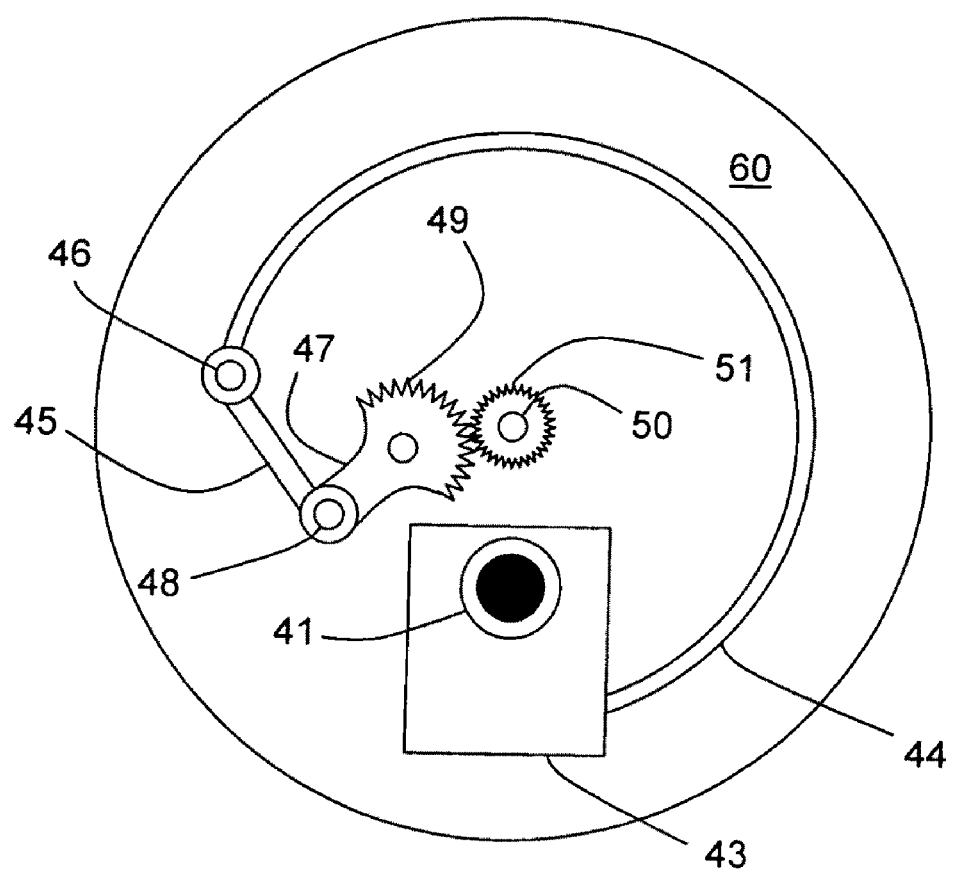
FIG. 15c is a rear view of a cross section of the pressure gauge of the preferred embodiment, showing the internal parts of the pressure gauge.

Preferably the misting apparatus includes a pressure gauge 28. The pressure gauge 28 is operably connected to the water tank 11 so it can detect the pressure within the water tank 11 and is preferably integral with the cap 15. The pressure gauge 28 can be any gauge capable of sensing the pressure in the water tank 11, but is preferably an aneroid gauge such as the Bourdon gauge shown in FIGS. 15a-c. An air tube 41 is connected to the interior chamber of the water tank 11 and the neck 42 of the pressure gauge 28. The pressure in the water tank passes through the air tube 41 and neck 42 to a receiver block 43. A substantially flattened metal, preferably copper, tube 44, shaped like a semicircle and having an open end and a closed end, is attached to the receiver block 43 at the open end. The open end attaches to a link 45, forming a pivot around a pivot pin 46. The link 45 attaches to a lever 47, forming another pivot around a pivot pin 48. The lever 47 is integral with a sector gear 49. The sector gear 49 is in contact with a spur gear 51 which is attached to the needle axle 50. The needle axle 50 passes through the face 60 of the pressure gauge 28 and attaches to an indicating needle (not shown). As the pressure in the water tank 11 increases, the change passes through the air tube 41 to the receiver block 43, and into the metal tube 44, causing the closed end of the metal tube 44 to move as the diameter of the semicircle increases. The movement causes the sector gear 48 to spin, which then causes the spur gear 51 to spin in the opposite direction, causing the needle to move, indicating to the user an increase in pressure. A decrease in pressure causes the parts to move in the opposite direction.

Figure 1:
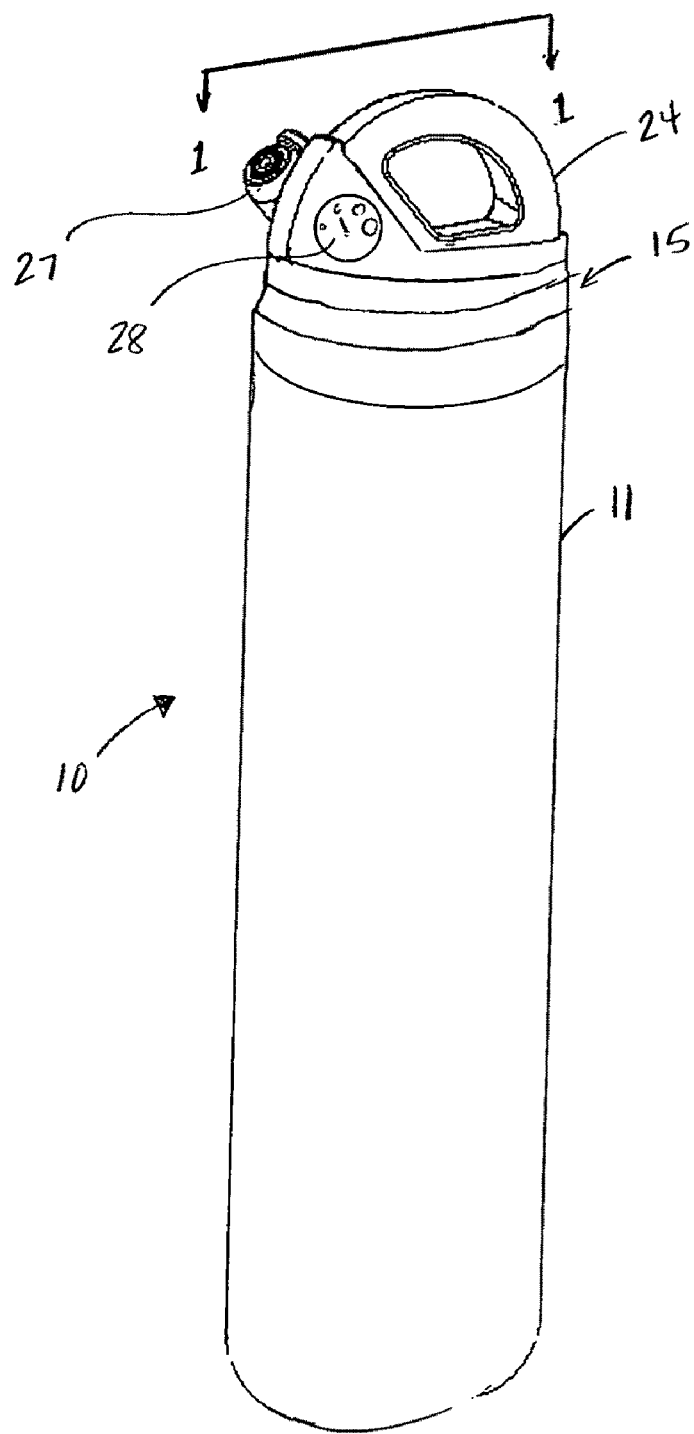
FIG. 1 is a front perspective view of the preferred embodiment of the present invention.
Figure 2:
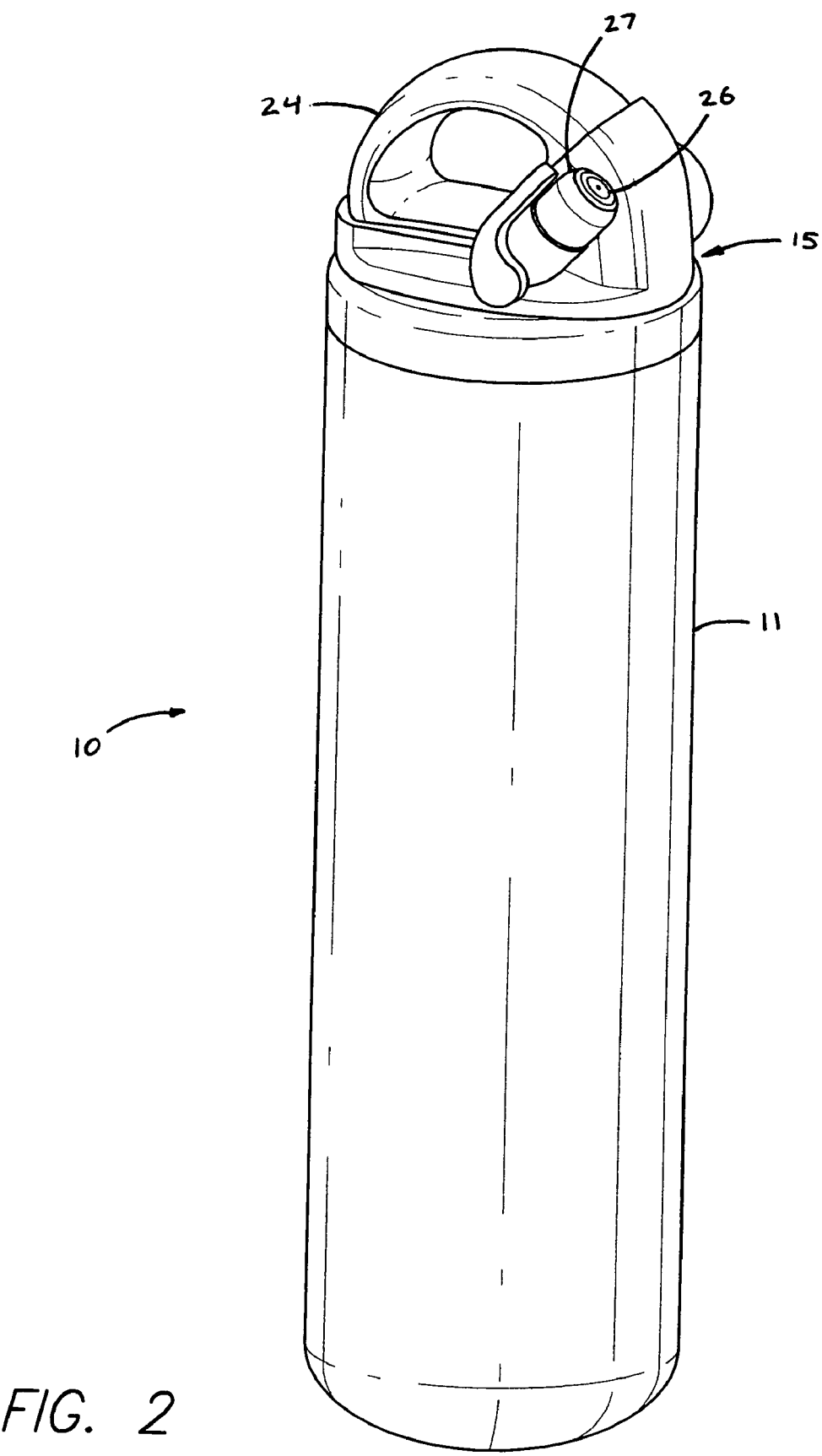
Fig. 2 is a rear perspective view of the preferred embodiment of the present invention.
Figure 3:
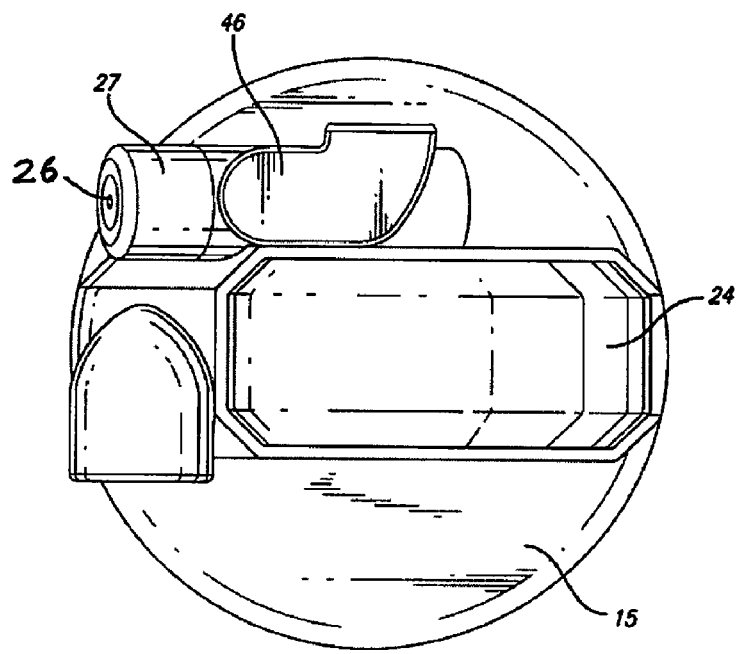
FIG. 3 is a top view of the preferred embodiment of the present invention.
Figure 4:
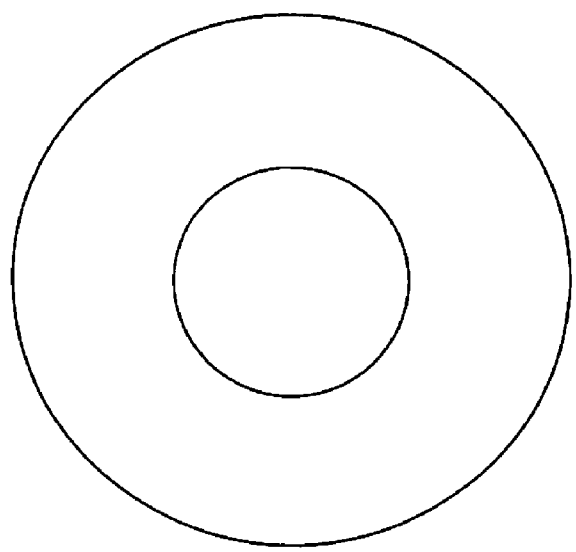
FIG. 4 is a bottom view of the preferred embodiment of the present invention.
Figure 5:
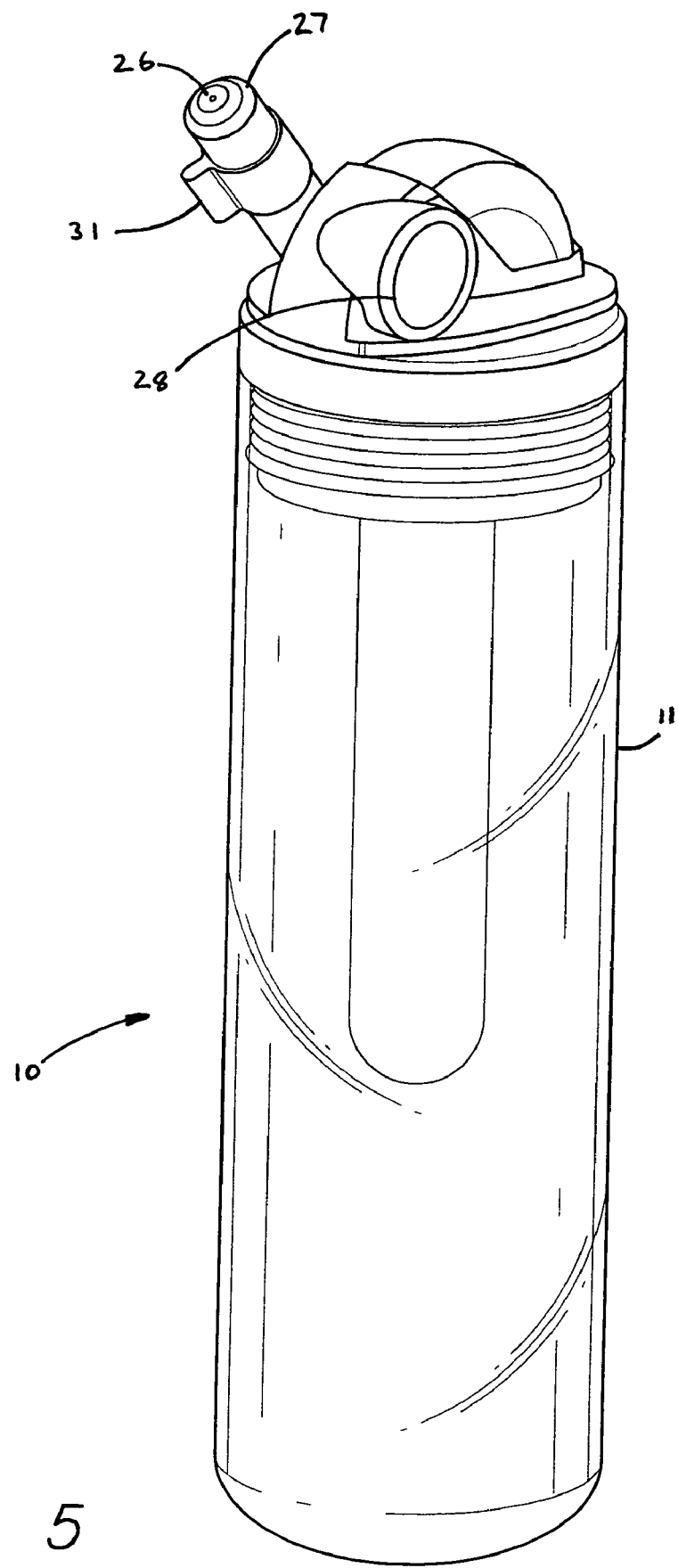
FIG. 5 is a front perspective view of a second embodiment of the present invention.
Figure 6:
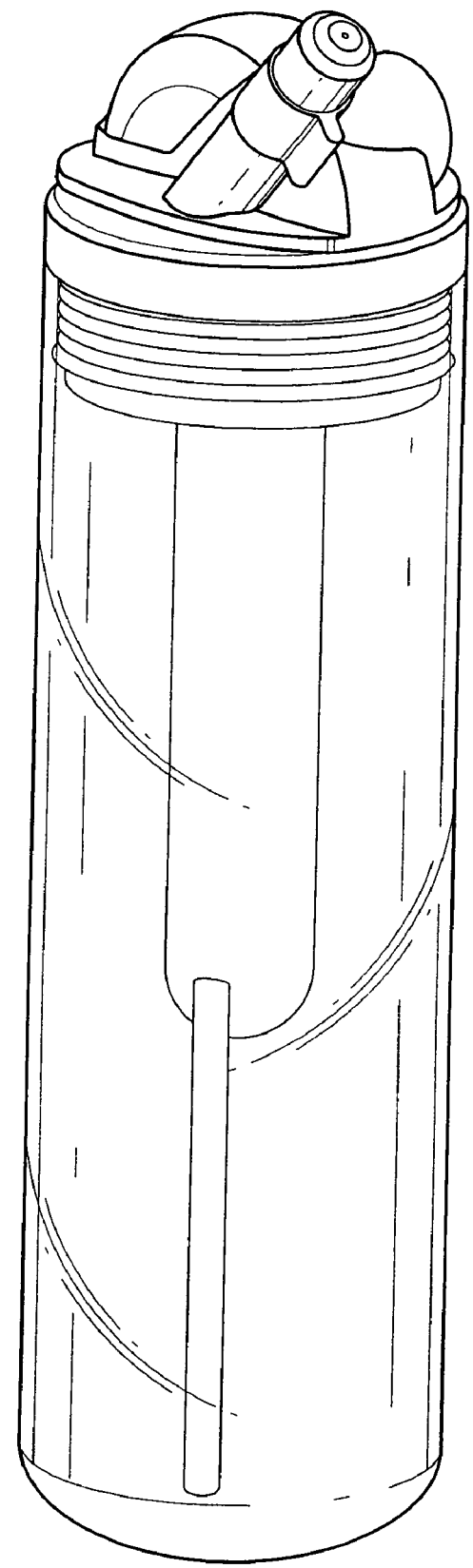
FIG. 6 is a rear perspective view of the second embodiment of the present invention.
Figure 7:
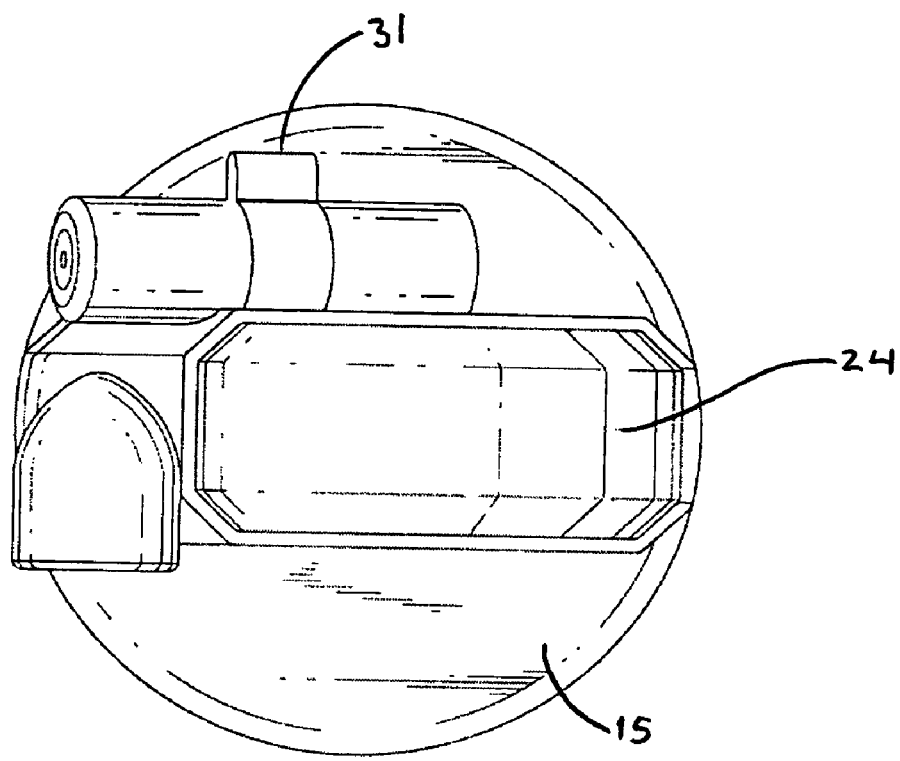
FIG. 7 is a top view of the second embodiment of the present invention.
Figure 8:
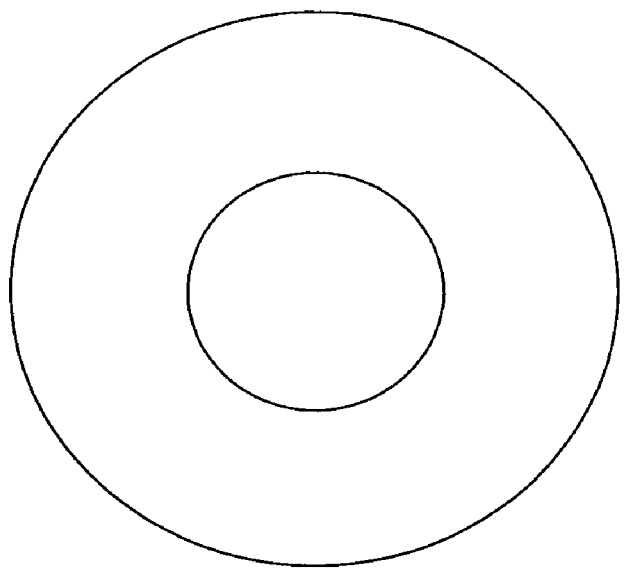
FIG. 8 is a bottom view of the second embodiment of the present invention.

The pressure will change as the misting device is operated, and the user can read the pressure gauge 28 to determine when the inner water chamber is sufficiently pressurized. The readout on the pressure gauge 28 may display the pressure in any format useful to the user, such as a digital or analog display of the current pounds per square inch (PSI) of pressure, or a single indicator that activates when sufficient pressure is achieved. In the preferred embodiment, the readout displays an analog meter with a needle that rises through indicators, showing the pressure currently contained. For example, as shown in FIG. 1, the pressure gauge displays the pressure inside the water tank by way of a series of symbols, namely a plurality of shapes arranged by increasing size, corresponding to increasing pressure in the water tank.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A misting apparatus for cooling a localized area, the apparatus having pressurizable water tank, a cap mated with the water tank, a pump connected to the water tank, and a nozzle connected to the water tank such that pressurizing the water tank with the pump results in the emission of evaporative mist into the localized area, wherein the improvement comprises:
   a) a flow valve integral with the cap; and
   b) a handle attached to the pump, the handle being integral with the cap to form a substantially smooth surface and to serve as a carrying handle when the pump is in a depressed position.

2. The misting apparatus of claim 1 wherein the improvement further comprises:
   a) a pressure gauge connected to the water tank and capable of detecting and displaying the pressure inside the water tank.

3. The misting apparatus of claim 1 wherein the pressurizable water tank is portable.

4. The misting apparatus of claim 1 wherein the pressurizable water tank is held in a user's hand.

5. The misting apparatus of claim 1 wherein the pump is hand-powered.

6. The misting apparatus of claim 1 wherein the nozzle is removably connected to the water tank.

7. The misting apparatus of claim 1 wherein the flow valve further comprises a flow lever having an open position and a closed position.

8. The misting apparatus of claim 7 wherein the flow lever partially inhibits the emission of evaporative mist when the flow lever is between the open position and the closed position, and the emission is increasingly inhibited as the flow lever is moved toward the closed position.

9. The misting apparatus of claim 2 wherein the pressure gauge displays the pressure inside the inner water chamber in units of pounds per square inch.

10. The misting apparatus of claim 2 wherein the pressure gauge displays the pressure inside the water tank by way of a series of symbols.

11. The misting apparatus of claim 10 wherein the series of symbols comprises a plurality of shapes arranged by increasing size, corresponding to increasing pressure in the water tank.

12. The misting apparatus of claim 11 wherein the shapes are circles.

13. A portable misting apparatus for cooling a localized area, comprising:
   a) a pressurizable hand-held water tank comprising a water intake aperture and an inner water chamber;
   b) a cap removably connected to the water intake aperture, the cap comprising:
      i. a flow valve;
      ii. a flow lever; and
      iii. a removable nozzle;
   c) a hand-powered piston pump connected to the cap such that, when the cap is connected to the water intake aperture, activating the pump pressurizes the inner water chamber;
   d) a pressure gauge connected to the water tank and capable of detecting and displaying the pressure inside the water tank; and
   e) a handle attached to the pump, the handle being integral with the cap to form a substantially smooth surface and to serve as a carrying handle when the pump is in a depressed position.

14. A portable misting apparatus for cooling a localized area, the portable misting apparatus comprising:
   a) a pressurizable hand-held water tank having an exterior surface and comprising a water intake aperture and an inner water chamber, the water tank being threaded at the water intake aperture;
   b) a cap having an exterior surface and a threaded outer surface that cooperates with the threaded water tank such that an airtight seal is formed and the exterior surface of the cap and the exterior surface of the tank are integrated to achieve a substantially smooth surface;
   c) a flow control assembly comprising:
      i. a flow valve integral with the cap;
      ii. an inner tube extending into the inner water chamber and configured to conduct fluid from the inner water chamber to the flow valve: and
      iii. a variable flow lever attached to the flow valve;
   d) a removable nozzle attached to the cap;
   e) a pressure gauge connected to the water tank and capable of detecting and displaying the pressure inside the water tank;
   f) a hand-powered piston pump connected to the cap such that, when the cap is connected to the water intake aperture, activating the pump pressurizes the inner water chamber; and
   g) a handle attached to the pump, the handle being configured to:
      i. operate the pump;
      ii. serve as a carrying handle when the pump is in a depressed position; and
      iii. be integral and form a substantially smooth surface with the cap when the pump is in a depressed position.

* * * * *